US010291429B2

(12) United States Patent
Tashiro et al.

(10) Patent No.: US 10,291,429 B2
(45) Date of Patent: May 14, 2019

(54) CONTROL DEVICE AND CONTROL METHOD

(71) Applicants: Kabushiki Kaisha Toshiba, Minato-ku, Toyko (JP); Toshiba Infrastructure Systems & Solutions Corporation, Kawasaki-shi, Kanagawa (JP)

(72) Inventors: Taichi Tashiro, Tokyo (JP); Keiji Yamamoto, Tokyo (JP); Kazuya Negishi, Saitama (JP); Kohta Nakamura, Tokyo (JP)

(73) Assignees: Kabushiki Kaisha Toshiba, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 5 days.

(21) Appl. No.: 15/565,639

(22) PCT Filed: Jan. 13, 2016

(86) PCT No.: PCT/JP2016/050859
§ 371 (c)(1),
(2) Date: Oct. 10, 2017

(87) PCT Pub. No.: WO2016/166996
PCT Pub. Date: Oct. 20, 2016

(65) Prior Publication Data
US 2018/0076977 A1 Mar. 15, 2018

(30) Foreign Application Priority Data
Apr. 15, 2015 (JP) .................. 2015-083570

(51) Int. Cl.
*H04W 40/00* (2009.01)
*H04L 12/46* (2006.01)
(Continued)

(52) U.S. Cl.
CPC .............. *H04L 12/46* (2013.01); *H04L 12/14* (2013.01); *H04L 12/66* (2013.01); *H04M 15/00* (2013.01);
(Continued)

(58) Field of Classification Search
CPC ......... H04W 4/14; H04W 4/24; H04W 84/06; H04M 2215/32; H04L 29/08108
(Continued)

(56) References Cited

U.S. PATENT DOCUMENTS 6,311,054 B1 * 10/2001 Korpela ............. G06Q 30/0283
455/406
7,899,019 B1 * 3/2011 Evans ................... H04W 28/20
370/338
(Continued)

FOREIGN PATENT DOCUMENTS

JP 02-238734 9/1990
JP 2001-251689 9/2001
(Continued)

OTHER PUBLICATIONS

International Search Report in PCT Application No. PCT/JP2016/050859 dated Mar. 29, 2016.

*Primary Examiner* — Anthony S Addy
*Assistant Examiner* — Matthew W Genack
(74) *Attorney, Agent, or Firm* — Knobbe, Martens, Olson & Bear, LLP

(57) ABSTRACT

A control device according to an embodiment includes a calculator, a changing unit, and a transmitter. The calculator calculates a first communication volume obtained by adding a value obtained by normalizing a communication volume of a voice call of a first terminal and a value obtained by normalizing a communication volume of data communication of the first terminal on the basis of a first history of the voice call of the first terminal and a second history of the data communication of the first terminal. The changing unit changes a first upper limit of a third priority obtained by adding a first priority set to the voice call of the first terminal
(Continued)

and a second priority set to the data communication of the first terminal on the basis of the first communication volume.

9 Claims, 10 Drawing Sheets

(51) Int. Cl.
 H04M 15/00 (2006.01)
 H04L 12/66 (2006.01)
 H04L 12/14 (2006.01)
(52) U.S. Cl.
 CPC ......... *H04M 15/59* (2013.01); *H04M 15/60* (2013.01); *H04M 15/63* (2013.01); *H04M 15/80* (2013.01); *H04M 15/8005* (2013.01); *H04M 15/8214* (2013.01); *H04M 15/853* (2013.01); *H04M 15/57* (2013.01); *H04M 15/70* (2013.01); *H04M 15/74* (2013.01)
(58) Field of Classification Search
 USPC ............ 455/405–408, 414.1, 428, 466
 See application file for complete search history.

(56) References Cited

U.S. PATENT DOCUMENTS

| | | | | |
|---|---|---|---|---|
| 2004/0127225 | A1* | 7/2004 | Qiu | H04W 28/26 455/450 |
| 2007/0060182 | A1* | 3/2007 | Chen | H04W 4/10 455/518 |
| 2007/0177626 | A1* | 8/2007 | Kotelba | H04L 1/0002 370/468 |
| 2013/0223423 | A1* | 8/2013 | Lee | H04W 48/16 370/338 |
| 2014/0204756 | A1 | 7/2014 | Higashino et al. | |
| 2014/0359076 | A1* | 12/2014 | Wan | H04N 21/23439 709/219 |

FOREIGN PATENT DOCUMENTS

| | | |
|---|---|---|
| JP | 2009-141826 | 6/2009 |
| JP | 2013-058994 | 3/2013 |
| JP | 2013-187646 | 9/2013 |
| JP | 2013-255178 | 12/2013 |
| JP | 2014-33350 | 2/2014 |
| JP | 2014-222833 | 11/2014 |

* cited by examiner

FIG.3

| TERMINAL ID | BASE STATION ID | COMMUNI-CATION STATE | CUMULA-TIVE CALL TIME | VOICE CALL PRIORITY | DATA COMMUNI-CATION VOLUME | DATA COMMUNI-CATION PRIORITY |
|---|---|---|---|---|---|---|
| 1000 | BASE STATION 1 | DURING COMMUNI-CATION | 6h20m | 3 | 7.5GB | 1 |
| 1001 | BASE STATION 1 | DURING COMMUNI-CATION | 31h15m | 1 | 0.5GB | 3 |
| 1002 | BASE STATION 1 | DURING COMMUNI-CATION | 19h20m | 2 | 4.5GB | 2 |
| 1003 | BASE STATION 2 | DURING CALL ORIGINATION | 21h45m | 1 | 10GB | 1 |
| 1004 | BASE STATION 2 | DURING CALL ORIGINATION | 4h30m | 3 | 2.4GB | 2 |

FIG.4

| TERMINAL ID | CUMULA-TIVE CALL TIME | VOICE CALL PRIORITY | DATA COMMUNI-CATION VOLUME | DATA COMMUNI-CATION PRIORITY | INTEGRAT-ED COMMUNI-CATION VOLUME | INTEGRAT-ED PRIORITY |
|---|---|---|---|---|---|---|
| 1000 | 6h20m | 3 | 7.5GB | 1 | 1.45 | 4 |
| 1001 | 31h15m | 1(⇒2) | 0.5GB | 3(⇒2) | 1.3 | 4 |
| 1002 | 19h20m | 2 | 4.5GB | 2 | 1.28 | 4 |
| 1003 | 21h45m | 1 | 10GB | 1 | 2.59 | 2 |
| 1004 | 10h30m | 2 | 2.4GB | 2(⇒3) | 0.69 | 5 |

FIG.5

| INTEGRATED PRIORITY UPPER LIMIT | RANGE OF INTEGRATED COMMUNICATION VOLUME |
|---|---|
| 5 | $x<1.0$ |
| 4 | $1.0 \leq x < 1.5$ |
| 3 | $1.5 \leq x < 2.0$ |
| 2 | $2.0 \leq x < 2.5$ |
| 1 | $2.5 \leq x$ |

FIG.6

| PRIORITY | CUMULATIVE VOICE CALL TIME THRESHOLD VALUE | DATA COMMUNICATION VOLUME THRESHOLD VALUE | CONTINUOUS CALL TIME THRESHOLD VALUE | QoS |
|---|---|---|---|---|
| 3 | 0 TO 10h | 0 TO 2GB | 3h | HIGH |
| 2 | 10 TO 20h | 2 TO 7GB | 2h | INTERMEDIATE |
| 1 | 20h TO | 7GB TO | 1h | LOW |

FIG.7

| TERMINAL ID | CUMULATIVE CALL TIME | VOICE CALL PRIORITY | DATA COMMUNI-CATION VOLUME | DATA COMMUNI-CATION PRIORITY | INTEGRATED PRIORITY |
|---|---|---|---|---|---|
| 1000 | 6h20m | 3 | 7.5GB | 1 | 4 |

| PRIORITY INPUT I/F | ○ | VOICE CALL PRIORITY: 3 | ● | DATA COMMUNI-CATION PRIORITY: 3 |
|---|---|---|---|---|
| | ● | VOICE CALL PRIORITY: 2 | ○ | DATA COMMUNI-CATION PRIORITY: 2 |
| | ○ | VOICE CALL PRIORITY: 1 | ○ | DATA COMMUNI-CATION PRIORITY: 1 |

| INTEGRATED PRIORITY UPPER LIMIT | 5 | UPPER LIMIT EXCESS INFOR-MATION |
|---|---|---|

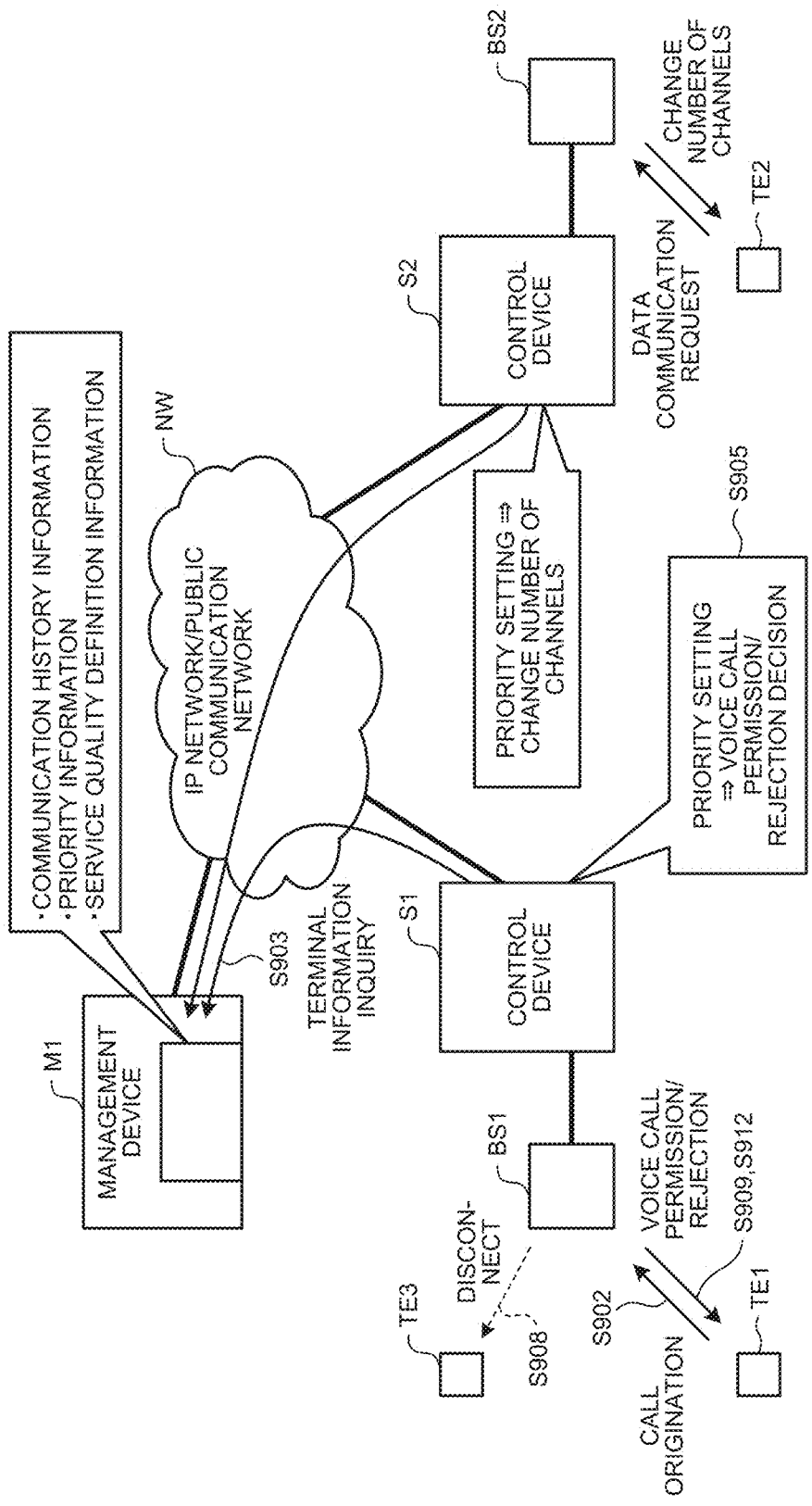

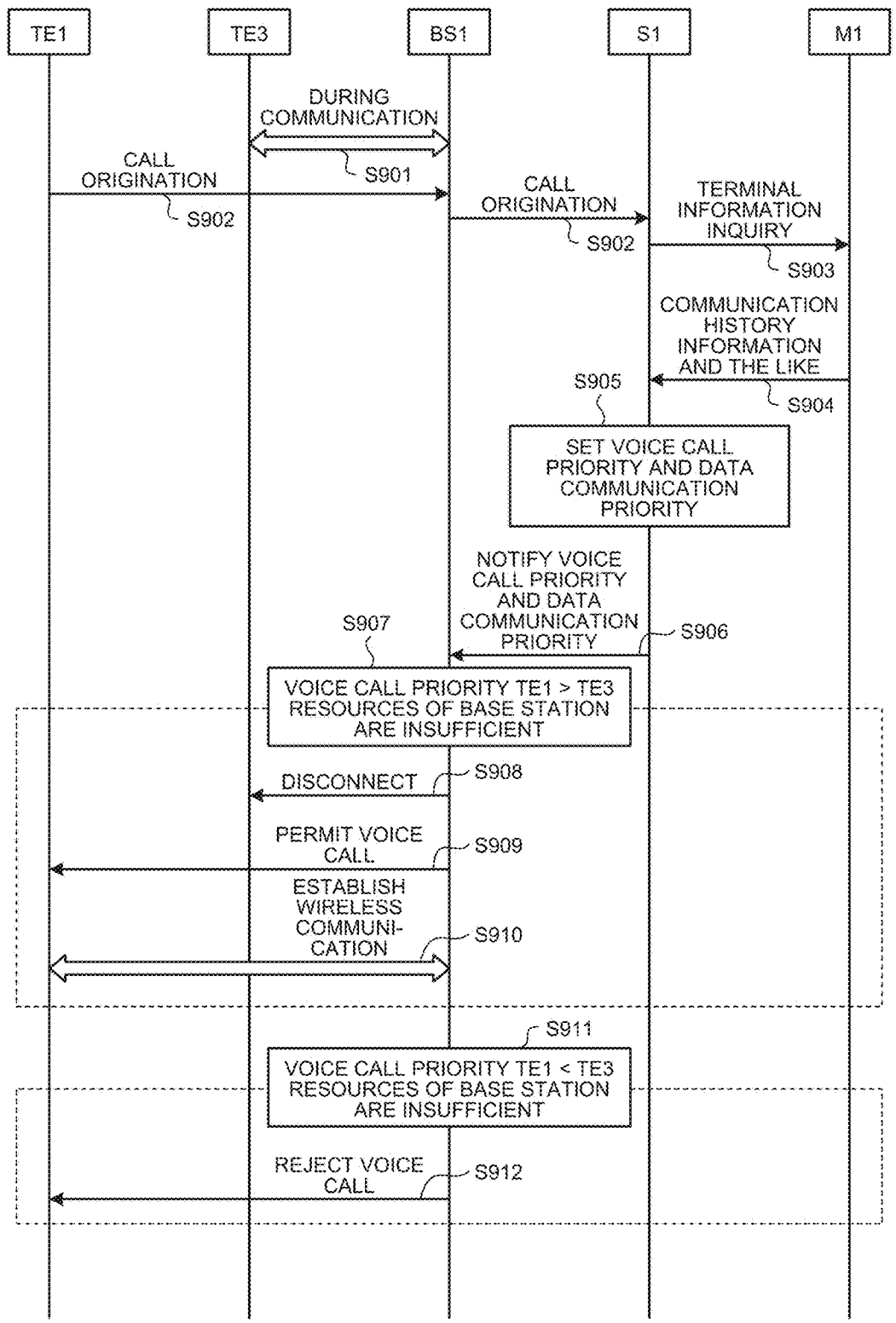

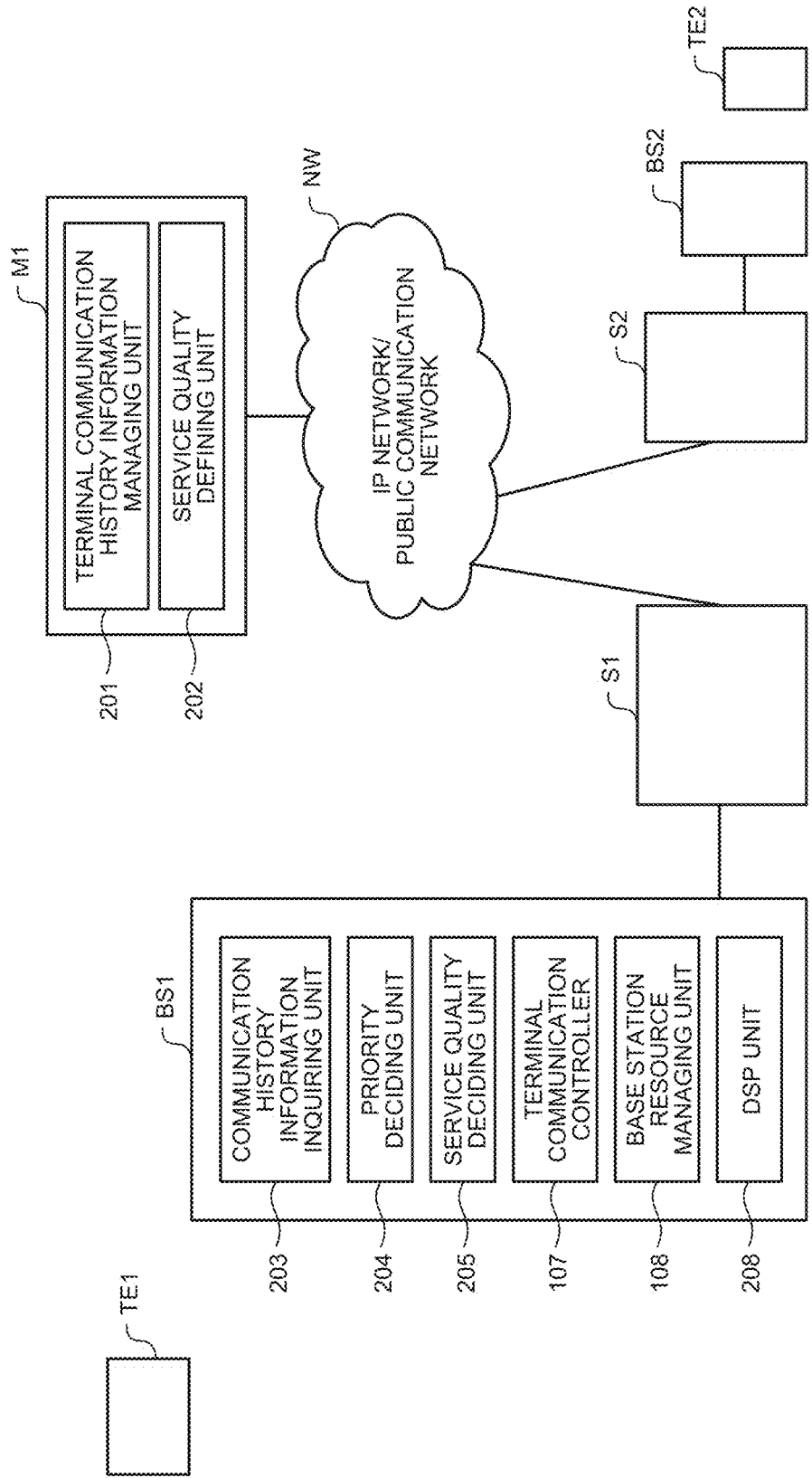

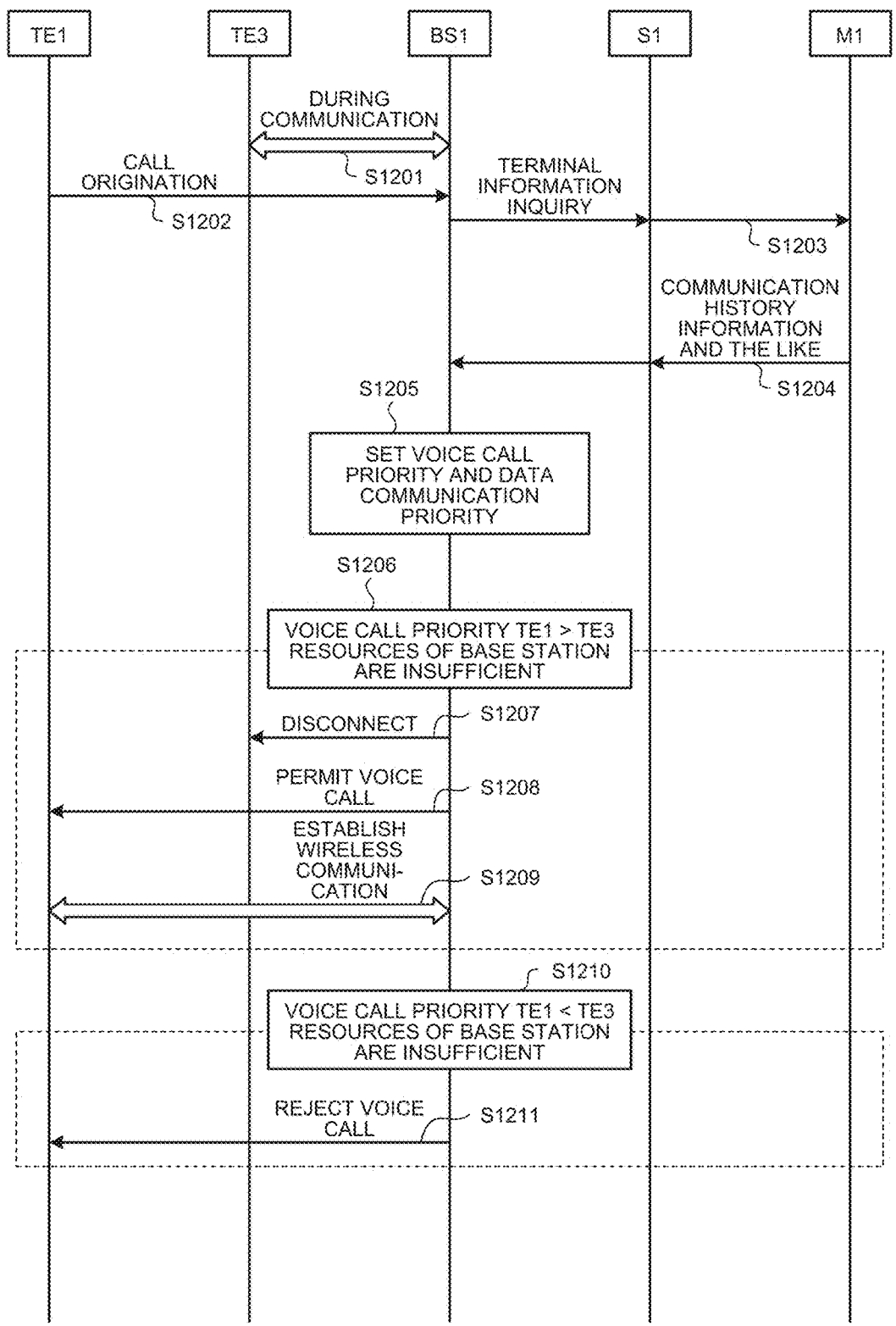

CONTROL DEVICE AND CONTROL METHOD

CROSS-REFERENCE TO RELATED APPLICATIONS

This application is national stage application of International Application No. PCT/JP2016/050859, filed Jan. 13, 2016, which designates the United States, incorporated herein by reference, and which claims the benefit of priority from Japanese Application No. 2015-083570, filed on Apr. 15, 2015, the entire contents of which are incorporated herein by reference.

FIELD

Embodiments of described herein relate generally to a control device and a control method.

BACKGROUND

In communication systems, a method of restricting communication performed by each terminal in accordance with a continuous available call time based on a flat-rate voice service, a cumulative data communication volume based on a flat-rate packet service, or the like is performed.

By the way, when communication systems having the flat-rate voice service as the basic plan become the mainstream, users who hardly use a voice call do not often reach a usage enough to receive the benefit of the flat-rate voice service. Further, when communication systems having the flat-rate packet service as the basic plan become the mainstream, users who hardly use data communication do not often reach a usage enough to receive the benefit of the flat-rate packet service. In this case, the users are likely to have a sense of unfairness about a contract rate of the basic plan.

BRIEF DESCRIPTION OF DRAWINGS

FIG. 3 is a diagram illustrating an example of a data structure of communication history information stored in a management device of the communication system according to the first embodiment;

FIG. 4 is a diagram illustrating an example of a result of setting a voice call priority, a data communication priority, and an integrated priority in the communication system according to the first embodiment;

FIG. 5 is a diagram illustrating an example of an integrated priority decision table in the communication system according to the first embodiment;

FIG. 6 is a diagram illustrating an example of a priority decision table in the communication system according to the first embodiment;

FIG. 7 is a diagram illustrating an example of a priority change screen displayed in the communication system according to the first embodiment;

FIG. 8 is a diagram for describing an example of a method of controlling communication of a communication terminal in the communication system according to the first embodiment;

FIG. 9 is a sequence diagram illustrating an example of the flow of the method of controlling the communication of the communication terminal in the communication system according to the first embodiment;

FIG. 10 is a diagram illustrating an example of a functional configuration of respective devices of a communication system according to a second embodiment;

FIG. 12 is a sequence diagram illustrating an example of the flow of the method of controlling the communication of the communication terminal in the communication system according to the second embodiment.

DETAILED DESCRIPTION

In general, a control device according to an embodiment includes a calculator, a changing unit, and a transmitter. The calculator calculates a first communication volume obtained by adding a value obtained by normalizing a communication volume of a voice call of a first terminal and a value obtained by normalizing a communication volume of data communication of the first terminal on the basis of a first history of the voice call of the first terminal and a second history of the data communication of the first terminal. The changing unit changes a first upper limit of a third priority obtained by adding a first priority set to the voice call of the first terminal and a second priority set to the data communication of the first terminal on the basis of the first communication volume. The transmitter transmits first information instructing to display a first screen including the first upper limit to the first terminal.

Hereinafter, a communication system to which a control device and a control method according to the present embodiment are applied will be described with reference to the appended drawings.

(First Embodiment)

Figure 1:
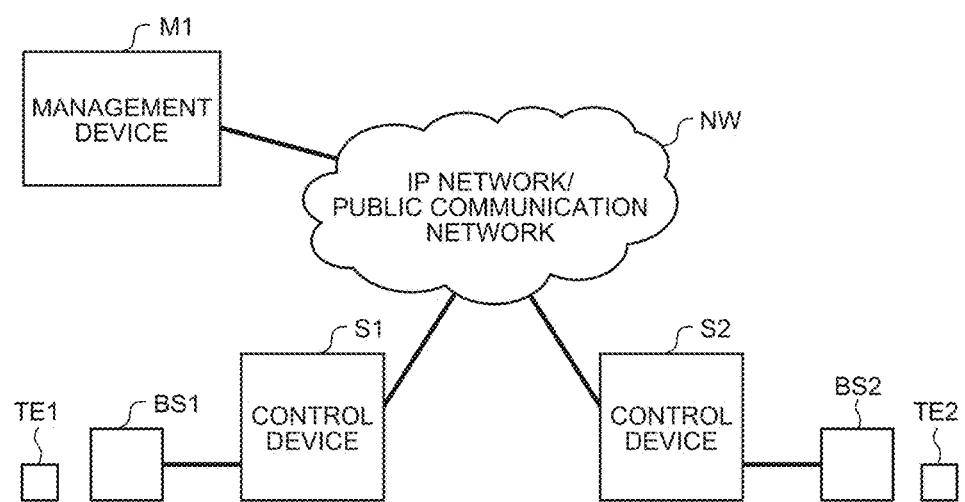
FIG. 1 is a diagram illustrating an example of a configuration of a communication system according to a first embodiment.

FIG. 1 is a diagram illustrating an example of a configuration of a communication system according to a first embodiment. As illustrated in FIG. 1, the communication system according to the present embodiment includes communication terminals TE1, TE2, . . . , TEn (hereinafter referred to as a "communication terminal TE" when it is unnecessary to distinguish the communication terminals TE1, TE2, . . . , TEn), base stations BS1 and BS2 (hereinafter referred to as a "base station BS" when it is unnecessary to distinguish the base stations BS1 and BS2), control devices S1 and S2 (hereinafter referred to as a "control device S" when it is unnecessary to distinguish the control devices S1 and S2), and a management device M1. The control device S is connected to an IP network/public communication network NW. In addition, each control device S has a base station BS capable of performing communication without going through the IP network/public communication network NW. Further, the control device S establishes a path used for communication with the base station BS included in the control device S and another base station BS included in another control device S connected via the IP network/public communication network NW.

The base station BS can perform wireless communication with the communication terminal TE. In response to a call requesting a voice call or data communication from the communication terminal TE, the base station BS starts communication with the communication terminal TE and controls participation of the communication terminal TE in the communication system. The management device M1 stores various kinds of information such as communication history information indicating a communication history of each communication terminal TE and service quality definition information used for a setting of a priority for each communication terminal TE. In response to a transmission instruction given from the control device S or the base station BS, the management device M1 transmits various kinds of information such as the communication history information and the service quality definition information to the control device S and the base station BS.

Figure 2:
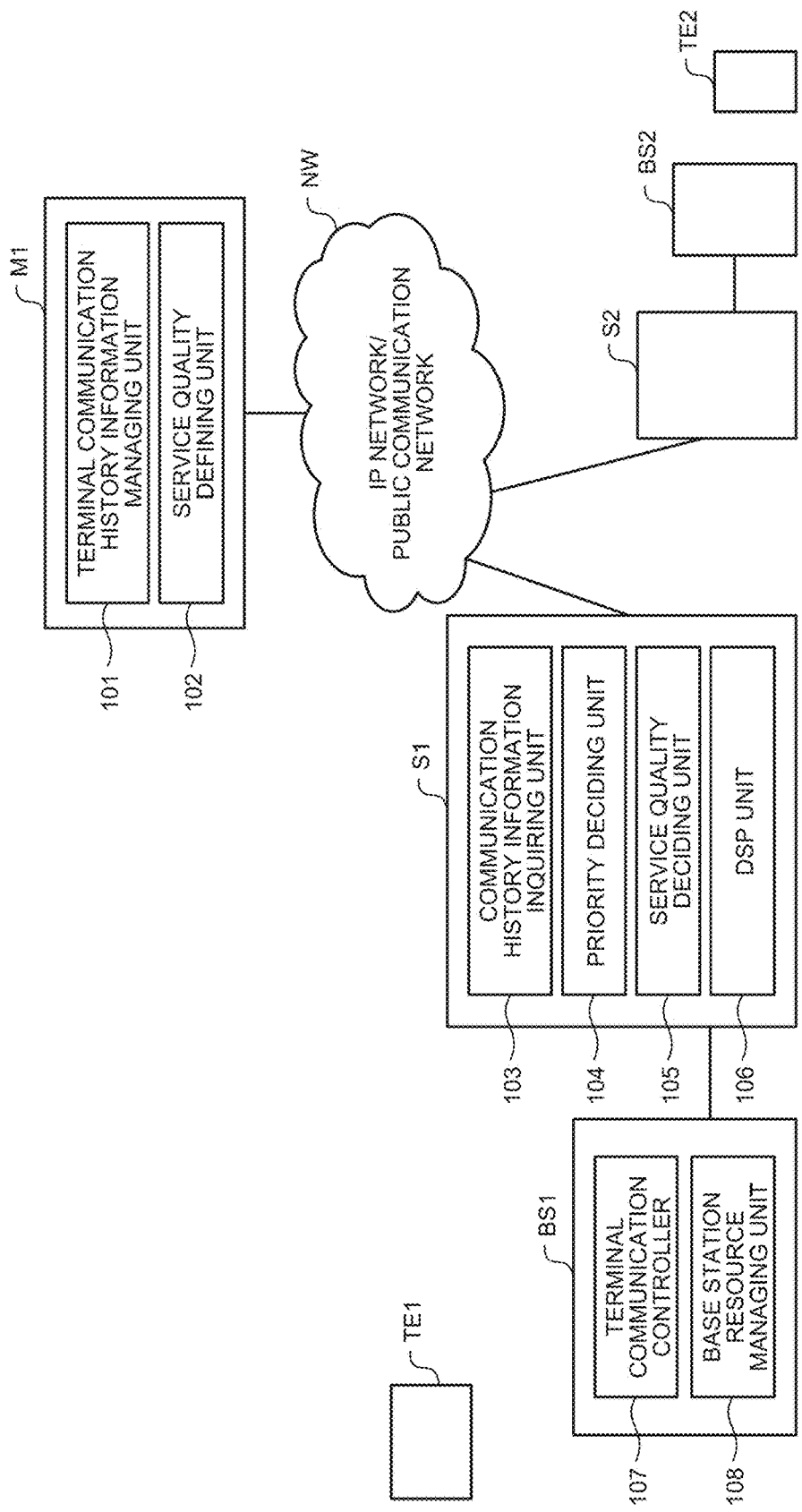
FIG. 2 is a diagram illustrating an example of a functional configuration of respective devices of the communication system according to the first embodiment.

FIG. 2 is a diagram illustrating an example of a functional configuration of respective devices of the communication system according to the first embodiment. The management device M1 includes a terminal communication history information managing unit 101 and a service quality defining unit 102 as illustrated in FIG. 2. The terminal communication history information managing unit 101 stores information related to communication of each communication terminal TE. In the present embodiment, the terminal communication history information managing unit 101 stores a voice call history which is a history of the voice call of the communication terminal TE (for example, a cumulative call time) and a data communication history which is a history of data communication of the communication terminal TE (for example, a data communication volume). Further, the terminal communication history information managing unit 101 delivers the communication history information of the communication terminal TE of the call origination source to the control device S.

The service quality defining unit 102 holds priority information indicating a priority set for each of the voice call and the data communication of the communication terminal TE of the call origination source (hereinafter referred to simply as "communication" when it is necessary to distinguish the voice call and the data communication from each other) and the service quality definition information used for a setting the priority to the communication of the communication terminal TE. The service quality defining unit 102 delivers the priority information and the service quality definition information to the control device S when the control device S performs a communication control process of enabling communication between the communication terminals TE. The service quality defining unit 102 also delivers the priority information and the service quality definition information to the control device S when content of the service quality definition information is changed or when the control device S is activated.

The control device S includes a communication history information inquiring unit 103, a priority deciding unit 104, a service quality deciding unit 105, and a digital signal processing (DSP) unit 106. In response to the call originated from the communication terminal TE, the communication history information inquiring unit 103 establishes communication with a control device S capable of performing communication with another communication terminal TE serving as a communication partner of the communication terminal TE. Further, the communication history information inquiring unit 103 acquires the communication history information, the priority information, and the service quality definition information of the communication terminal TE of the call origination source from the management device M1. The priority deciding unit 104 sets a priority to the communication of the communication terminal TE on the basis of the communication history information, the priority information, or the service quality definition information acquired from the management device M1.

The service quality deciding unit 105 decides the service quality of the communication of the communication terminal TE on the basis of the priority set by the priority deciding unit 104. Then, the DSP unit 106 controls, for example, a codec of the voice call of the communication terminal TE in accordance with the service quality decided by the service quality deciding unit 105.

The base station BS includes a terminal communication controller 107 and a base station resource managing unit 108. The terminal communication controller 107 controls communication of the communication terminal TE in accordance with at least one of the service quality decided by the control device S and a use state of resources detected by the base station resource managing unit 108 to be described later. The base station resource managing unit 108 detects a use state of resources such as the number of channels that the base station BS can use for wireless communication and the number of simultaneous connections which is the number of communication terminals TE capable of simultaneously performing wireless communication.

Next, the data structure of the communication history information stored in the management device M1 of the communication system according to the present embodiment will be described with reference to FIG. 3. FIG. 3 is a diagram illustrating an example of the data structure of the communication history information stored by the management device of the communication system according to the first embodiment.

In the present embodiment, the terminal communication history information managing unit 101 of the management device M1 stores a base station ID indicating a base station BS with which the communication terminal TE can perform wireless communication, a communication state between the communication terminal TE and the base station BS (for example, during communication, during call origination, or the like), a cumulative call time which is an example of the voice call history of the communication terminal TE, a voice call priority which is a priority set to the voice call of the communication terminal TE and serves as an index of the service quality of the voice call of the communication terminal TE (an example of a first priority), a data communication volume which is an example of the data communication history of the communication terminal TE, and a data communication priority which is a priority set to the data communication of the communication terminal TE and serves as an index of the service quality of the data communication of the communication terminal TE (an example of a second priority) in association with a terminal ID indicating the communication terminal TE.

The terminal communication history information managing unit 101 updates the communication state, the voice call history, and the data communication history of the communication terminal TE when the communication (the voice call and the data communication) of the communication terminal TE starts or ends. The terminal communication history information managing unit 101 delivers the communication history information to the control device S in response to an inquiry transmitted from the control device S when the control device S performs the communication control process next.

In the present embodiment, the voice call priority is updated on the basis of the cumulative call time and the service quality definition information when the voice call of the communication terminal TE ends. For example, the voice call priority is set to decrease as the cumulative call time increases and to increase as the cumulative call time decreases. Further, as the voice call priority increases, the communication terminal TE is more preferentially processed when the voice call is performed. Specifically, the communication terminal TE is able to receive various services of increasing the degree of satisfaction of the user in the voice call, for example, such that the quality of a codec that can be used in the voice call increases as the voice call priority increases.

The data communication priority is also updated on the basis of the data communication volume and the service quality definition information when the data communication of the communication terminal TE ends. For example, the data communication priority is set to decrease as the data communication volume increases and increase as the data communication volume decreases. As the data communication priority increases, the communication terminal TE is more preferentially processed when data communication is performed. Accordingly, the service quality of the data communication is improved, and the degree of satisfaction of the user is increased.

When the communication terminal TE is lower in the voice call priority than another communication terminal TE, the voice call of another communication terminal TE is preferentially processed. Therefore, when resources used for the voice call are insufficient, the voice call by the communication terminal TE is rejected, or the codec usable for the voice call of the communication terminal TE is restricted to a low-quality codec. Accordingly, resources are surrendered to another communication terminal TE with high voice call priority, and fairness with other communication terminals TE with a shorter resource occupation time (that is, the communication terminal TE with a shorter cumulative call time) is guaranteed. As a type of codec usable for the voice call of the communication terminal TE, codecs are used in the order of G722, G711, and G729 from the high-quality codec.

In the present embodiment, each of the voice call priority and the data communication priority of the communication terminal TE can be set to any one of three priority steps stepwise, but a changeable priority step thereof can be arbitrarily changed in accordance with a size or a management index of the communication system. A threshold value of the cumulative call time used for changing the setting of the voice call priority can be arbitrarily set. Similarly, the threshold value of the data communication volume used for changing the setting of the data communication priority can be arbitrarily set.

The terminal ID, the base station ID, the communication state, the cumulative call time, and the voice call priority are included in the communication history information illustrated in FIG. 3, but content of the communication history information is not limited thereto, and communication failure information indicating a history of a communication failure that has occurred in communication of the communication terminal TE or the like may be included. Accordingly, it is possible to set the priority in the communication of the communication terminal TE in view the communication failure information or the like in addition to the history of the voice call and the history of data communication, and thus it is possible to flexibly set the priority to the communication of the communication terminal TE in accordance with the state or preference of the user who uses the communication terminal TE.

For example, when the communication failure information included in the communication history information of the communication terminal TE indicates that the communication failure often occurs due to a poor radio environment or the like, the voice call priority or the data communication priority of the communication terminal TE is set to be high so that the voice call or the data communication of the communication terminal TE is preferentially processed.

Next, a process of setting the voice call priority and the data communication priority of the communication terminal TE through the control device S of the communication system according to the present embodiment will be described with reference to FIGS. 4 to 7. FIG. 4 is a diagram illustrating an example of a result of setting the voice call priority, the data communication priority, and the integrated priority in the communication system according to the first embodiment. FIG. 5 is a diagram illustrating an example of an integrated priority decision table in the communication system according to the first embodiment. FIG. 6 is a diagram illustrating an example of a priority decision table in the communication system according to the first embodiment. FIG. 7 is a diagram illustrating an example of a priority change screen displayed in the communication system according to the first embodiment. The following description will proceed with an example in which the control device S1 sets the voice call priority and the data communication priority in the communication terminal TE1, but a similar process is performed even when another control device S sets the voice call priority and the data communication priority in the communication terminal TE.

In the communication system according to the present embodiment, as a method of flexibly setting the priority in the communication terminal TE in accordance with the state or the preference of the user, a balance type priority setting method of setting the priority on the basis of both the voice call history and the data communication history is used. In general, in the case of the communication terminal TE of the user who often uses the voice call, the degree of satisfaction of the user is not high even if the data communication priority in the data communication is high. On the other hand, in the case of the communication terminal TE of the user who often uses the data communication, the degree of satisfaction of the user is not high even if the voice call priority in voice call is high. Such a user is unable to use up to the upper limit of the usable communication volume even though the communication that is hardly used by the user can be used in the flat-rate service and is thus dissatisfied with the flat-rate service. In this regard, in the communication system according to the present embodiment, the degree of satisfaction of the user who uses the communication function of the communication terminal TE is improved by setting the voice call priority and the data communication priority using the balance type priority setting method.

Specifically, when the control device S performs the communication control process, the communication history information inquiring unit 103 of the control device S1 transmits a terminal information inquiry for giving an instruction to transmit the communication history information, the priority information, and the service quality definition information of the communication terminal TE1 to the management device M1. Then, the communication history information inquiring unit 103 receives the communication history information, the priority information, and the service quality definition information transmitted from the management device M1 in response to the terminal information inquiry.

The priority deciding unit 104 of the control device S1 (an example of a calculator) calculates an integrated communication volume x (an example of a first communication volume) which is obtained by normalizing and adding the communication volumes of the voice call and the data communication of the communication terminal TE1 on the basis of the voice call history and the data communication history indicated by the communication history information received by the communication history information inquiring unit 103. Since the communication volume of the voice call and the communication volume of the data communication differ in a type of communication, if the value obtained adding the communication volume of the voice call and the communication volume of the data communication without normalization is used as the integrated communication volume x, the integrated communication volume x is not considered to be a value in which the communication volume of the voice call and the communication volume of the data communication are equally considered. Therefore, the priority deciding unit 104 uses a value obtained by adding a value obtained by normalizing the communication volume of the voice call and a value obtained by normalizing the communication volume of the data communication as the integrated communication volume x.

In the present embodiment, as described above, the priority deciding unit 104 calculates a value obtained by adding a first normalized communication volume obtained by normalizing the communication volume of the voice call of the communication terminal TE1 and a second normalized communication volume obtained by normalizing the communication volume of the data communication of the communication terminal TE1 as the integrated communication volume x. At this time, the priority deciding unit 104 may multiply the first normalized communication volume by a correction amount according to the voice call priority of the communication terminal TE1 and multiply the second normalized communication volume by a correction amount according to the data communication priority of the communication terminal TE1. Further, the priority deciding unit 104 may multiply the first normalized communication volume by a degree of influence which is a degree of influence of the voice call on the integrated communication volume x and multiply the second normalized communication volume by a degree of influence which is a degree of influence of the data communication on the integrated communication volume x.

Specifically, the priority deciding unit 104 calculates the integrated communication volume x using the following Formula (1).

$$x=(V1/Va)*VLR*R+(D1/Da)*DLR*(1-R) \quad (1)$$

Here, V1 indicates the cumulative call time of the communication terminal TE1, Va indicates an average voice call time (for example, 15 hours) which is an average of the cumulative call times of all the communication terminals TE, VLR indicates a correction amount according to the voice call priority of the communication terminal TE1 (0.8, 1.0, and 1.2 are in order from the correction amount of the high voice call priority), D1 indicates the data communication volume of the communication terminal TE1, Da indicates an average data communication volume (for example, 3.5 GB) which is an average of the data communication volumes of all the communication terminals TE, DLR indicates a correction amount according to the data communication priority of the communication terminal TE1 (0.8, 1.0, and 1.2 are in order from the correction amount of the high data communication priority), and R indicates a degree of influence of each of the voice call and the data communication on the integrated communication volumex (for example, the degree of influence of the voice call:the degree of influence of the data communication=0.5:0.5).

Then, the priority deciding unit 104 (an example of a changing unit) changes an integrated priority upper limit (an example of a first upper limit) which is an upper limit of an integrated priority (an example of a third priority) obtained by adding the voice call priority (the voice call priority set to the voice call of the communication terminal TE1) and the data communication priority (the data communication priority set to the data communication of the communication terminal TE1) indicated by priority information on the basis of the calculated integrated communication volume x. In the present embodiment, the priority deciding unit 104 changes the integrated priority upper limit stepwise on the basis of the integrated communication volume x. For example, the priority deciding unit 104 extracts the integrated priority upper limit associated with the calculated integrated communication volume x from the integrated priority decision table (see FIG. 5) included in the service quality definition information. The integrated priority decision table stores the integrated priority upper limit and the threshold value of the integrated communication volume x to be changed to the integrated priority upper limit in association with each other as illustrated in FIG. 5. For example, when the calculated integrated communication volume x is smaller than the threshold value (1.0), the priority deciding unit 104 extracts the integrated priority upper limit (5) from the integrated priority decision table. Further, the priority deciding unit 104 (an example of a second setting unit) may change the threshold value of the integrated communication volume x for changing the integrated priority upper limit in accordance with information input by the user in the communication terminal TE.

Then, the priority deciding unit 104 (an example of a transmitter) transmits screen display information (an example of first information) for giving an instruction to display the priority change screen (an example of a first screen) which is a screen including at least the integrated priority upper limit to the communication terminal TE1 via the base station BS1. Accordingly, since the user of the communication terminal TE can recognize that the voice call priority and the data communication priority can be set within the range of the integrated priority upper limit, it is possible to set the voice call priority and the data communication priority in accordance with the preference of the user even when there are many integrated communication volumes x, and it is possible to cause the users to be unlikely to have a sense of unfairness about a contract rate of the basic plan such as the flat-rate voice service or the flat-rate packet service.

In the present embodiment, when the communication terminal TE1 logs in a web system provided by the communication system, the priority deciding unit 104 transmits screen display information for displaying a priority change screen G illustrated in FIG. 7 to the communication terminal TE1 via the base station BS1. The priority change screen G includes a first region R1 on which the terminal ID (1000), the cumulative call time (6 h 20 m), the voice call priority (3), the data communication volume (7.5 GB), the data communication priority (1), and the integrated priority (4) of the communication terminal TE1 are displayed. The priority change screen G further includes a second region R2 on which a priority input OF which is a user interface for inputting the voice call priority and the data communication priority is displayed. The priority change screen G further includes a third region R3 on which the integrated priority upper limit (for example, "5") and upper limit excess information indicating that the integrated priority x exceeds the integrated priority upper limit are displayed. The user of the communication terminal TE1 can input the voice call priority and the data communication priority using the priority input I/F displayed on the second region R2.

For example, when information indicating that the voice call priority is "1," and the data communication priority is "3" is displayed on the first region R1 of the priority change screen G, if the voice call is desired to be preferentially used, the user of the communication terminal TE having the terminal ID (1001) operates the priority input I/F to decrease the data communication priority by "1" and set the voice call priority to "2." Accordingly, even when there are many integrated communication volumes x, it is possible to increase the service quality of the voice call, and thus it is possible to cause the users to be unlikely to have a sense of unfairness about a contract rate of the basic plan such as the flat-rate packet service.

Further, when information indicating that both the voice call priority and the data communication priority are "2," and the integrated priority upper limit is "5" is displayed on the first region R1 of the priority change screen G, if the data communication is desired to be preferentially used, the user of the communication terminal TE having the terminal ID (1004) operates the priority input I/F to increase the data communication priority to "3" without decreasing the voice call priority. Accordingly, even when there are many integrated communication volumes x, it is possible to maintain both the service quality of the voice call and the data communication to be high, and thus it is possible to cause the users to be unlikely to have a sense of unfairness about a contract rate of the basic plan such as the flat-rate voice service or the flat-rate packet service. Further, instead of using a communication volume of only one of the voice call and the data communication as an index for the communication restriction, it is possible to use the communication volumes of both the voice call and the data communication as an index for the communication restriction, and thus the communication control can be implemented in accordance with the preference of the user of the communication terminal TE.

The priority deciding unit 104 receives input information including at least one of the voice call priority and the data communication priority input in the communication terminal TE1 from the communication terminal TE1 via the base station BS1. Then, the priority deciding unit 104 (an example of the first setting unit) sets at least one of the voice call priority VL and the data communication priority DL within a range in which the integrated priority upper limit is not exceeded in accordance with the input information received from the communication terminal TE1 as indicated in the following Formula (2).

Integrated priority x=voice call priority VL+data communication priority DL≤integrated priority upper limit (2)

Thereafter, the service quality deciding unit 105 (an example of the deciding unit) decides the service qualities of the voice call and the data communication of the communication terminal TE1 on the basis of the voice call priority and the data communication priority set by the priority deciding unit 104. Specifically, as the voice call priority decreases, the service quality deciding unit 105 decreases the continuous call time (an example of the first time) which is an example of the service quality of the voice call. Here, the continuous call time is an upper limit of a period of time in which the communication terminal TE can continuously perform a voice call. Further, as the voice call priority decreases, the service quality deciding unit 105 decreases the quality of codec (an example of a first codec) used in the DSP unit 106. Here, the codec is an example of the service quality of the voice call of the communication terminal and indicates a codec that can be used in the voice call of the communication terminal TE.

In the present embodiment, the service quality deciding unit 105 decides the service qualities of the voice call and the data communication of the communication terminal TE using the service quality decision table illustrated in FIG. 6. In the service quality determination table, as illustrated in FIG. 6, the service qualities such as a cumulative voice call time threshold value which is an upper limit of a call time in which the communication terminal TE can perform the voice call, a data communication volume threshold value which is an upper limit of the communication volume in which the communication terminal TE can perform the data communication, the continuous call time (an example of the first time) which is an upper limit of a period of time in which the communication terminal TE can continuously perform the voice call, and a quality of service (QoS) which is a level of the communication quality of the data communication of the communication terminal TE are stored in association with a priority which is settable as the voice call priority or the data communication priority.

Then, when the voice call priority set by the priority deciding unit 104 is "3," the service quality deciding unit 105 decides "0 to 10 h" as the cumulative voice call time threshold value, and decides "3 h" as the continuous call time threshold value. Further, when the data communication priority set by the priority deciding unit 104 is "3," the service quality deciding unit 105 decides "0 to 2 GB" as the data communication volume threshold value, and decides "high" as the QoS.

The communication system generally imposes a penalty, for example, restricts the communication rate of the data communication to the communication terminal TE which has reached a data communication volume of a predetermined value or more so that a difference of the communication volume with the communication terminals TE of other users is not increased. However, if a penalty is imposed when the communication volume of the data communication of the communication terminal TE has reached the predetermined value or more even if the communication volume of the voice call of the communication terminal TE is small, the users have a sense of unfairness.

On the other hand, in the present embodiment, in the communication system, the communication of each of the voice call and the data communication can be restricted in accordance with the preference of the user by imposing communication restriction to the voice call and the data communication on the basis of the integrated communication volume x of the voice call and the data communication, and thus it is possible to cause the users to be unlikely to have a sense of unfairness.

Next, an example of a method of controlling the communication of the communication terminal TE in the communication system according to the present embodiment will be described with reference to FIGS. 8 and 9. FIG. 8 is a diagram for describing an example of the method of controlling the communication of the communication terminal in the communication system according to the first embodiment. FIG. 9 is a sequence diagram illustrating an example of the flow of the method of controlling the communication of the communication terminal in the communication system according to the first embodiment.

The terminal communication controller 107 of the base station BS1 performs communication with the communication terminal TE3 in response to a call originated from the communication terminal TE3 (Step S901). Upon receiving the call originated from the communication terminal TE1, the terminal communication controller 107 transfers the call received from the communication terminal TE1 to the control device S1 (Step S902).

Upon receiving the call from the communication terminal TE1 (an example of the first terminal), the communication history information inquiring unit 103 of the control device S1 establishes communication with the control device S2 capable of performing wireless communication with the communication terminal TE2 serving as a communication partner of the communication terminal TE1. Further, the communication history information inquiring unit 103 transmits the terminal information inquiry including the terminal ID of the communication terminal TE1 to the management device M1 and gives an instruction to transmit the communication history information, the priority information, and the service quality definition information (Step S903).

The terminal communication history information managing unit 101 of the management device M1 transmits the communication history information of the communication terminal TE1 indicated by the terminal ID including the terminal information inquiry received from the control device S1 to the control device S1 (Step S904). The service quality defining unit 102 of the management device M1 transmits the priority information and the service quality definition information of the communication terminal TE1 indicated by the terminal ID including the terminal information inquiry received from the control device S1 to the control device S1 (Step S904).

The communication history information inquiring unit 103 of the control device S1 (an example of the acquiring unit) receives (acquires) the communication history information, the priority information, and the service quality definition information transmitted from the management device M1 (an example of an external device). Then, the priority deciding unit 104 of the control device S1 calculates the integrated communication volume x on the basis of the received communication history information and changes the integrated priority upper limit on the basis of the calculated integrated communication volume x. In addition, the priority deciding unit 104 transmits the screen display information for giving an instruction to display the priority change screen G including the changed integrated priority upper limit to the communication terminal TE1 via the base station BS1. Thereafter, the priority deciding unit 104 sets the voice call priority and the data communication priority within the range in which the integrated priority does not exceed the integrated priority upper limit on the basis of the input information received from the communication terminal TE1 (Step S905).

The service quality deciding unit 105 of the control device S1 notifies the base station BS1 of the voice call priority and the data communication priority set by the priority deciding unit 104 (Step S906).

When the base station resource managing unit 108 detects that the resources of the base station BS1 are insufficient, the terminal communication controller 107 of the base station BS1 (an example of a controller) compares the voice call priorities of the two communication terminals TE1 and TE3 which are performing the voice call. Then, when the voice call priority of the communication terminal TE1 is higher than the voice call priority of another communication terminal TE3 (Step S907), the terminal communication controller 107 permits the voice call of the communication terminal TE1 (Step S909), and disconnects the voice call with another communication terminal TE3 (Step S908). In this case, the terminal communication controller 107 of the base station BS1 establishes wireless communication with the communication terminal TE1 (Step S910).

On the other hand, when the voice call priority of the communication terminal TE1 is lower than the voice call priority of another communication terminal TE3 (Step S911), the terminal communication controller 107 rejects the voice call of the communication terminal TE1 and continues the voice call of another communication terminal TE3 (Step S912).

Here, the method of controlling the communication of the communication terminal TE1 on the basis of the voice call priority when the communication terminal TE1 originates a call for requesting the voice call has been described, but even when the communication terminal TE2 requests the data communication, similarly, as illustrated in FIG. 8, the communication of the communication terminal TE2 is controlled, for example, by controlling the number of channels or the like which the communication terminal TE2 uses for the data communication on the basis of the data communication priority. Further, when it is detected that resources necessary for the voice call are insufficient, the terminal communication controller 107 rejects a call originated from the communication terminal TE which is lower in the voice call priority out of the two communication terminals TE1 and TE2 which have originated a call at the same time.

As described above, according to the communication system of the first embodiment, it is possible to set the voice call priority and the data communication priority in accordance with the preference of the user even when there are many integrated communication volumes x, and thus it is possible to cause the users to be unlikely to have a sense of unfairness about a contract rate of the basic plan such as the flat-rate voice service or the flat-rate packet service.

(Second Embodiment)

The present embodiment relates to an example in which the base station changes the integrated priority upper limit, and transmits the screen display information for giving an instruction to display a priority change screen including the changed integrated priority upper limit to the communication terminal. In the following description, description of parts similar to those of the first embodiment will be omitted.

FIG. 10 is a diagram illustrating an example of the functional configuration of each part of the communication system according to the second embodiment. In the present embodiment, the management device M1 includes a terminal communication history information managing unit 201 and a service quality defining unit 202 as illustrated in FIG. 10. The terminal communication history information managing unit 201 stores information related to the communication of each communication terminal TE. In the present embodiment, the terminal communication history information managing unit 201 stores communication history information including a voice call history (for example, a cumulative call time) which is a history of the voice call of the communication terminal TE and a data communication history (for example, a data communication volume) which is a history of the data communication of the communication terminal TE. Further, the terminal communication history information managing unit 201 delivers the communication history information of the communication terminal TE to the base station BS.

The service quality defining unit 202 holds priority information indicating the priority set to the communication of the communication terminal TE and service quality definition information used for setting the priority in the communication terminal TE. Further, when the control device S performs a communication control process, the service quality defining unit 202 delivers the priority information and the service quality definition information to the base station BS. Further, even when content of the service quality definition information is changed or even when the control device S is activated, the service quality defining unit 102 delivers the priority information and the service quality definition information to the base station BS.

In the present embodiment, instead of the control device S1, the base station BS1 (an example of the control device) includes a communication history information inquiring unit 203, a priority deciding unit 204, a service quality deciding unit 205, and a DSP unit 208 as illustrated in FIG. 10. In response to the call originated from the communication terminal TE, the communication history information inquiring unit 203 acquires the communication history information, the priority information, and the service quality definition information of the communication terminal TE of the call origination source from the management device M1. The priority deciding unit 204 sets a priority to the communication of the communication terminal TE on the basis of the communication history information, the priority information, and the service quality definition information acquired from the management device M1.

The service quality deciding unit 205 decides the service quality of the communication of the communication terminal TE on the basis of the priority set by the priority deciding unit 204. Then, the DSP unit 208 controls, for example, a codec of the voice call of the communication terminal TE in accordance with to the service quality decided by the service quality deciding unit 205.

A data structure of the communication history information stored in the management device M1 of the communication system according to the present embodiment is similar to the data structure of the communication history information stored in the management device M1 of the communication system according to the first embodiment (see FIG. 3). Further, a process of setting the priority to the communication of the communication terminal TE through the base station BS of the communication system according to the present embodiment is similar to the process of setting the priority to the communication of the communication terminal TE through the control device S of the communication system according to the first embodiment (see FIGS. 4 to 7).

Figure 11:
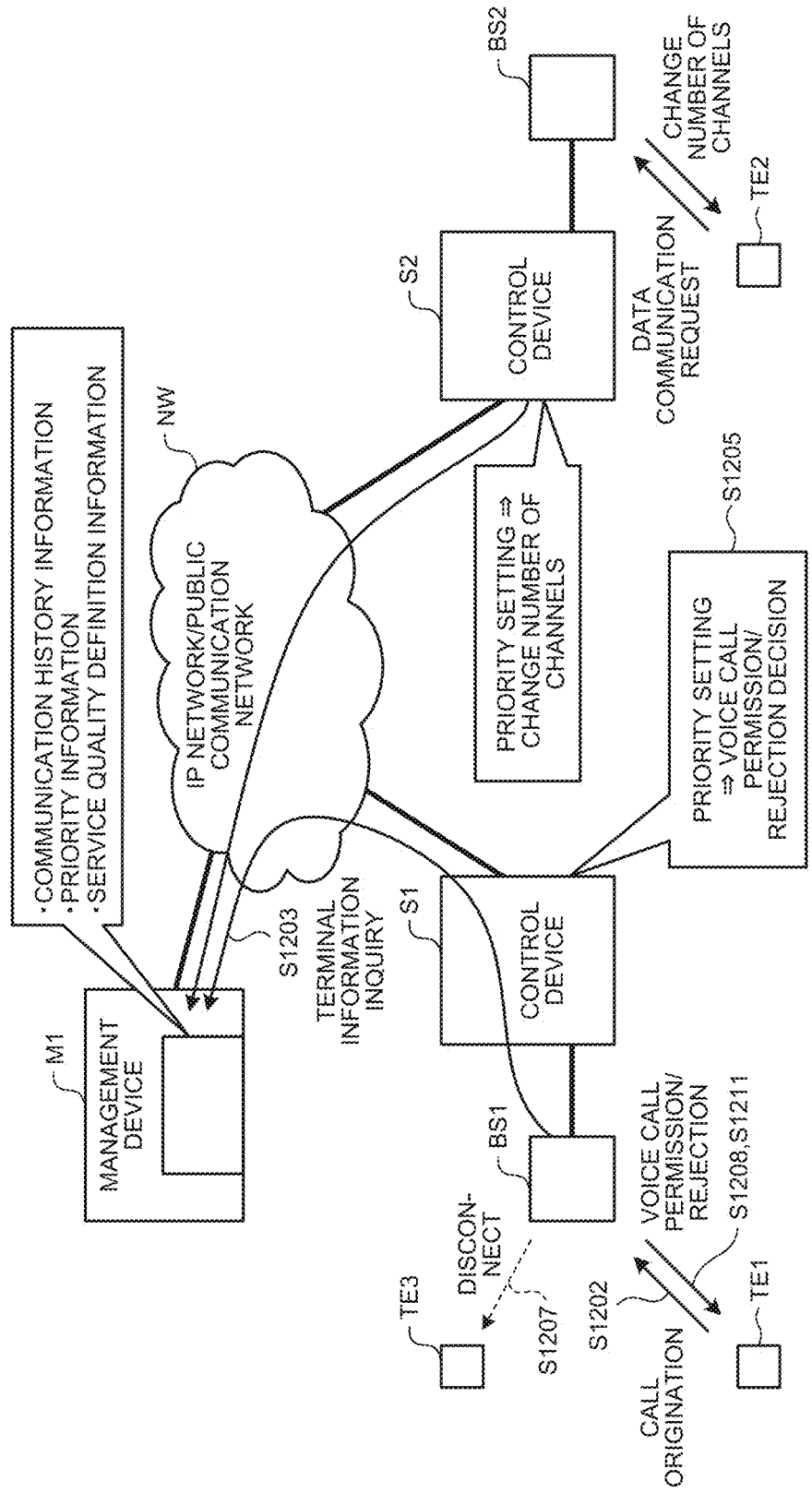
FIG. 11 is a diagram for describing an example of a method of controlling communication of a communication terminal in the communication system according to the second embodiment.

Next, an example of a method of controlling the communication of the communication terminal TE in the communication system according to the present embodiment will be described with reference to FIGS. 11 and 12. FIG. 11 is a diagram for describing an example of the method of controlling the communication of the communication terminal in the communication system according to the second embodiment. FIG. 12 is a sequence diagram illustrating an example of the flow of the method of controlling the communication of the communication terminal in the communication system according to the second embodiment.

In response to the call originated from the communication terminal TE3, the terminal communication controller 107 of the base station BS1 performs communication with the communication terminal TE3 (Step S1201). Upon receiving the call originated from the communication terminal TE1 (Step S1202), the communication history information inquiring unit 203 of the base station BS1 transmits the terminal information inquiry including the terminal ID of the communication terminal TE1 to the management device M1, and gives an instruction to transmit the communication history information, the priority Information, and the service quality definition information (Step S1203).

The terminal communication history information managing unit 201 of the management device M1 transmits the communication history information of the communication terminal TE1 indicated by the terminal ID included in the terminal information inquiry received from the base station BS1 to the base station BS1 (Step S1204). Further, the service quality defining unit 202 of the management device M1 transmits the priority information and the service quality definition information of the communication terminal TE1 indicated by the terminal ID included in the terminal information inquiry received from the base station BS1 to the base station BS1 (Step S1204).

The communication history information inquiring unit 203 of the base station BS1 receives the communication history information, the priority information, and the service quality definition information transmitted from the management device M1. Then, the priority deciding unit 204 of the base station BS1 calculates the integrated communication volume x on the basis of the received communication history information and changes the integrated priority upper limit on the basis of the calculated integrated communication volume x. Further, the priority deciding unit 204 transmits the screen display information for giving an instruction to display the priority change screen G including the changed integrated priority upper limit to the communication terminal TE1. Thereafter, the priority deciding unit 204 sets the voice call priority and the data communication priority within the range in which the integrated priority does not exceed the integrated priority upper limit on the basis of the input information received from the communication terminal TE1 (Step S1205).

When the base station resource managing unit 108 detects that the resources of the base station BS1 are insufficient, the terminal communication controller 107 of the base station BS1 compares the voice call priority of the communication terminal TE1 with the voice call priority of another communication terminal TE3. Then, when the voice call priority of the communication terminal TE1 is higher than the voice call priority of another communication terminal TE3 (Step 1206), the service quality deciding unit 205 permits the voice call of the communication terminal TE1 (Step S1208) and disconnects the voice call with another communication terminal TE3 (Step S1207). In this case, the terminal communication controller 107 of the base station BS1 establishes the wireless communication with the communication terminal TE1 (Step S1209).

On the other hand, when the voice call priority of the communication terminal TE1 is lower than the voice call priority of the other communication terminal TE3 (Step S1210), the terminal communication controller 107 rejects the voice call of the communication terminal TE1 and continues the voice call of another communication terminal TE3 (Step S1211).

Here, the method of controlling the communication of the communication terminal TE1 on the basis of the voice call priority when the communication terminal TE1 originates a call for requesting the voice call has been described, but even when the communication terminal TE2 requests the data communication, similarly, as illustrated in FIG. 11, the communication of the communication terminal TE2 is controlled, for example, by controlling the number of channels or the like which the communication terminal TE2 uses for the data communication on the basis of the data communication priority.

As described above, according to the communication system of the second embodiment, it is possible to obtain operations and effects similar to those of the first embodiment.

As described above, according to the first and second embodiments, it is possible to set the voice call priority and the data communication priority in accordance with the preference of the user even when there are many integrated communication volumes x, and thus it is possible to cause the users to be unlikely to have a sense of unfairness about a contract rate of the basic plan such as the flat-rate voice service or the flat-rate packet service.

Further, programs executed by the control device S and the base station BS of the present embodiment are incorporated into a read only memory (ROM) or the like in advance and provided. The programs executed by the control device S and the base station BS of the present embodiment may be recorded in a computer readable recording medium such as a CD-ROM, a flexible disk (FD), a CD-R, or a digital versatile disk (DVD) in a file of installable format or an executable format and provided.

Furthermore, the programs executed by the control device S and the base station BS of the present embodiment may be stored on a computer connected to a network such as the Internet and downloaded via the network and provided. In addition, the programs executed by the control device S and the base station BS of the present embodiment may be provided or distributed via a network such as the Internet.

Each of the programs executed by the control device S and the base station BS of the present embodiment has a module configuration including the above-described respective units (the communication history information inquiring units 103 and 203, the priority deciding units 104 and 204, the service quality deciding units 105 and 205, the terminal communication controller 107, and the base station resource managing unit 108), and when a central processing unit (CPU) reads and executes the programs read from the read only memory (ROM) as actual hardware, the respective units are loaded onto a main storage device, and the communication history information inquiring units 103 and 203, the priority deciding units 104 and 204, the service quality deciding units 105 and 205, the terminal communication controller 107, and the base station resource managing unit 108 are generated on the main storage device.

The exemplary embodiments of the present invention have been described above, but the above embodiments are presented by way of examples and are not intended to limit the scope of the invention. The novel embodiments can be implemented in various other forms, and various omissions, substitutions, and changes can be made without departing from the gist of the invention. The embodiments and modifications thereof are included in the scope and gist of the invention and are included in the range of equivalents to the inventions set forth in claims.

The invention claimed is:

1. A control device, comprising:
a processor configured to:
calculate an integrated communication volume obtained by adding a value obtained by normalizing a communication volume of a voice call of a communication terminal and a value obtained by normalizing a communication volume of data communication of the communication terminal on the basis of a voice call history of the voice call of the communication terminal and a data communication history of the data communication of the communication terminal;
determine an integrated priority upper limit of an integrated priority obtained by adding a voice call priority set to the voice call of the communication terminal and a data communication priority set to the data communication of the communication terminal on the basis of the integrated communication volume;
transmit screen display information instructing to display a priority change screen to the communication terminal, the priority change screen being a screen which includes the voice call priority, the data communication priority, the integrated priority, a priority input I/F, and the integrated priority upper limit, the priority input I/F being a user interface to input the voice call priority and the data communication priority within a range in which the integrated priority does not exceed the integrated priority upper limit;
receive input information including the voice call priority and the data communication priority input in the communication terminal; and
set the voice call priority and the data communication priority within the range in which the integrated priority does not exceed the integrated priority upper limit in accordance with the input information received from the communication terminal.

2. The control device according to claim 1, wherein the processor sets a threshold value of the integrated communication volume for determining the integrated priority upper limit in accordance with information input by the communication terminal.

3. The control device according to claim 1, wherein, the processor is further configured to decide a service quality of the voice call of the communication terminal on the basis of the voice call priority and decides a service quality of the data communication of the communication terminal on the basis of the data communication priority.

4. The control device according to claim 3, wherein the service quality of the voice call of the communication terminal is a continuous call time which is an upper limit of a period of time in which the communication terminal is able to perform the voice call continuously, and
the processor decreases the continuous call time as the voice call priority decreases.

5. The control device according to claim 3, wherein the service quality of the voice call of the communication terminal is a codec which is usable in the voice call of the communication terminal, and
the processor causes the codec to have a lower quality as the voice call priority decreases.

6. The control device according to claim 1, wherein the communication terminal is a terminal that requests the voice call or the data communication, and
when the communication terminal requests the voice call or the data communication, the processor obtains communication history information indicating the voice call history and the data communication history from an external device.

7. The control device according to claim 6, wherein the processor is further configured to reject the request for the voice call of the communication terminal when the voice call priority of the communication terminal is lower than a voice call priority of another communication terminal that has requested a second voice call at the same time as the request for the voice call of the communication terminal and when insufficient resources exist to process both the voice call and the second voice call.

8. The control device according to claim 6,
wherein the processor is further configured to disconnect the voice call of the communication terminal when the voice call priority of the communication terminal is lower than a voice call priority of another communication terminal that is performing a second voice call when insufficient resources exist to process both the voice call and the second voice call.

9. A control method, comprising:
calculating an integrated communication volume obtained by adding a value obtained by normalizing a communication volume of a voice call of a communication terminal and a value obtained by normalizing a communication volume of data communication of the communication terminal on the basis of a voice call history of the voice call of the communication terminal and a data communication history of the data communication of the communication terminal;

determining an integrated priority upper limit of an integrated priority obtained by adding a voice call priority set to the voice call of the communication terminal and a data communication priority set to the data communication of the communication terminal on the basis of the integrated communication volume;

transmitting screen display information instructing to display a priority change screen to the communication terminal, the priority change screen being a screen which includes the voice call priority, the data communication priority, the integrated priority, a priority input I/F, and the integrated priority upper limit, the priority input I/F being a user interface to input the voice call priority and the data communication priority with in a range in which the integrated priority does not exceed the integrated priority upper limit;

receiving input information including the voice call priority and the data communication priority input in the communication terminal; and setting the voice call priority and the data communication priority within the range in which the integrated priority does not exceed the integrated priority upper limit in accordance with the input information received from the communication terminal.

* * * * *